(12) United States Patent
Peura

(10) Patent No.: US 6,945,899 B2
(45) Date of Patent: Sep. 20, 2005

(54) AXLE MODULE WITH AXLE SHAFT ELECTRONIC MANAGEMENT

(75) Inventor: Brent Peura, Farmington, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 133 days.

(21) Appl. No.: 10/093,564

(22) Filed: Mar. 8, 2002

(65) Prior Publication Data

US 2003/0171182 A1 Sep. 11, 2003

(51) Int. Cl.⁷ ............................................... F16H 48/22
(52) U.S. Cl. .................................... 475/234; 475/235
(58) Field of Search ............................. 475/150, 231, 475/234, 235; 192/35

(56) References Cited

U.S. PATENT DOCUMENTS

| | | | | | |
|---|---|---|---|---|---|
| 3,605,523 A | * | 9/1971 | O'Brien | ...................... | 475/234 |
| 6,398,686 B1 | * | 6/2002 | Irwin | ......................... | 475/150 |
| 6,582,336 B2 | * | 6/2003 | Forrest et al. | .............. | 475/150 |
| 6,592,487 B2 | * | 7/2003 | Gassmann | ................... | 475/223 |

* cited by examiner

*Primary Examiner*—Sherry Estremsky
(74) *Attorney, Agent, or Firm*—Jennifer M. Brumbaugh; Mick A. Nylander

(57) ABSTRACT

An axle module for use in an automotive vehicle. The axle module includes axle shaft electronic torque management. The axle module includes a housing having a differential carrier rotatably supported therein. The axle module also includes a differential gear set rotatably supported within the differential carrier. A clutch pack contacts the differential gear set and the differential carrier. The axle module also includes a shaft connected to the clutch pack wherein the shaft is axial moveable within the differential carrier and housing.

5 Claims, 5 Drawing Sheets

AXLE MODULE WITH AXLE SHAFT ELECTRONIC MANAGEMENT

TECHNICAL FIELD

The present invention relates to axles and differential drives for motor vehicles, and more particularly, relates to an axle module with axle shaft electronic torque management for use in a vehicle.

BACKGROUND OF THE INVENTION

Torque distribution systems in automotive vehicles have been known for many years. Generally, torque distribution devices either control the torque being transferred to an axle as found in an in-line "hang-on" all wheel drive system or may even control the torque being transferred to each individual wheel as found in a twin "hang-on" all wheel drive system. In a typical "hang-on" all wheel system there is a primary driven axle and a secondary driven "hang-on" axle that is connected via a prop shaft or drive shaft and torque transfer coupling to the primary driven axle. The primary driven axle also includes a differential which divides torque to the side shaft of each axle and then to the wheels. The division of torque between the primary and secondary axles is controlled by the torque transfer coupling which is usually integrated in the secondary axle.

A typical prior art "hang-on" all wheel drive system provides a permanent drive primary axle. However, when the primary axle starts to slip i.e. the wheels are on a slick road condition or loose gravel etc., the prior art systems apply torque in an even manner to each wheel of the secondary axle until the appropriate wheel torque is achieved. This provides a traction performance advantage over other "hang-on" torque distribution systems, under slip conditions similar to that of a limited slip differential. The prior art "hang-on" all wheel drive systems typically are either an active torque on demand system which is one that involves a mechanism that works to prevent an action versus the passive torque on demand system which reacts to an action by a wheel. Generally, the active torque on demand systems will preempt wheel slip by transmitting torque to the secondary drive axle based on known inputs such as wheel speeds, throttle position, g-sensors and other sensors located throughout the automotive vehicle.

However, with the increased traction performance of the prior art systems, a substantial number of draw backs are encountered such as complexity of the torque distribution system, the weight of the torque distribution system and the cost to manufacture and design such system. Furthermore, the prior art torque distribution systems, which generally were front wheel drive base systems, had the torque transfer device placed between the drive shaft and the rear axle pinion. Having the torque transfer device located there adds weight to the front of the axle pinion and also requires further shafts and supports as well as additional housings and associated components to complete the torque transfer between the primary driven axle and the secondary driven axle. There have been numerous attempts to overcome the above-identified problems in the area of conventional driveline systems. Most of these systems have tried to develop a method to reduce the mass, packaging requirements and/or joint angles of conventional axles by integrating the inborn side shafts joint and the differential housing. However, no such integration with an axle module having an axle shaft torque management system that includes speed sensing and an electronically controlled clutch pack has been provided to date.

Therefore, there is a need in the art for an axle module that includes an integration of a torque transfer coupling into a smaller package, having reduced weight and packaging requirements. Furthermore, there is a need in the art for a torque distribution system that can electronically be controlled and thus provide tuning for a specific vehicles desired handling and performance requirements.

SUMMARY OF THE INVENTION

One object of the present invention is to provide an improved torque distribution system.

Another object of the present invention is to provide an integrated axle module that includes axle shaft electronic torque management.

Yet a further object of the present invention is to reduce the weight and packaging requirements for an axle module in an automotive vehicle.

Another object of the present invention is to provide a torque distribution system that is capable of transferring a varying amount of torque to a secondary axle depending on requirements needed to improve handling as well as increase traction in wheel slip conditions.

It is still a further object of the present invention to provide an axle module that will increase the off road ability of a vehicle and also act as a limited slip device.

To achieve the fore going objects an axle module for use in a vehicle includes a housing. The axle module also includes a differential carrier rotatably supported within the housing. A differential gear set is rotatably supported within the differential carrier. A clutch pack which contacts the differential gear seat and the differential carrier is located within the axle module. The axle module also includes a shaft engaged with the clutch pack wherein the shaft is movable in an axial direction.

One advantage of the present invention is a new and improved torque distribution device for a vehicle.

A further advantage of the present invention is that the axle module improves traction while reducing the mass, weight and packaging requirements within the drivetrain system.

A further advantage of the present invention is that the axle module is capable of controlling torque to a secondary axle via a motor.

A further advantage of the present invention is that it is capable of transferring a varying amount of torque to a secondary axle depending on the amount required to improve handling and traction in slip conditions.

Yet a further advantage of the present invention is that the axle module increases the off-road ability of a vehicle well also acting as a limited slip device for the drivetrain system.

Still a further advantage of the present invention is that the prop shaft is driven directly from the transmission thus removing the need for a torque transfer coupling.

Other objects, features and advantages of the present invention will become apparent from the subsequent description and the appended claims, taken in conjunction with the accompanying drawings.

BEST MODE OF CARRYING OUT THE INVENTION AND DESCRIPTION OF THE PREFERRED EMBODIMENT(S)

Figure 1:
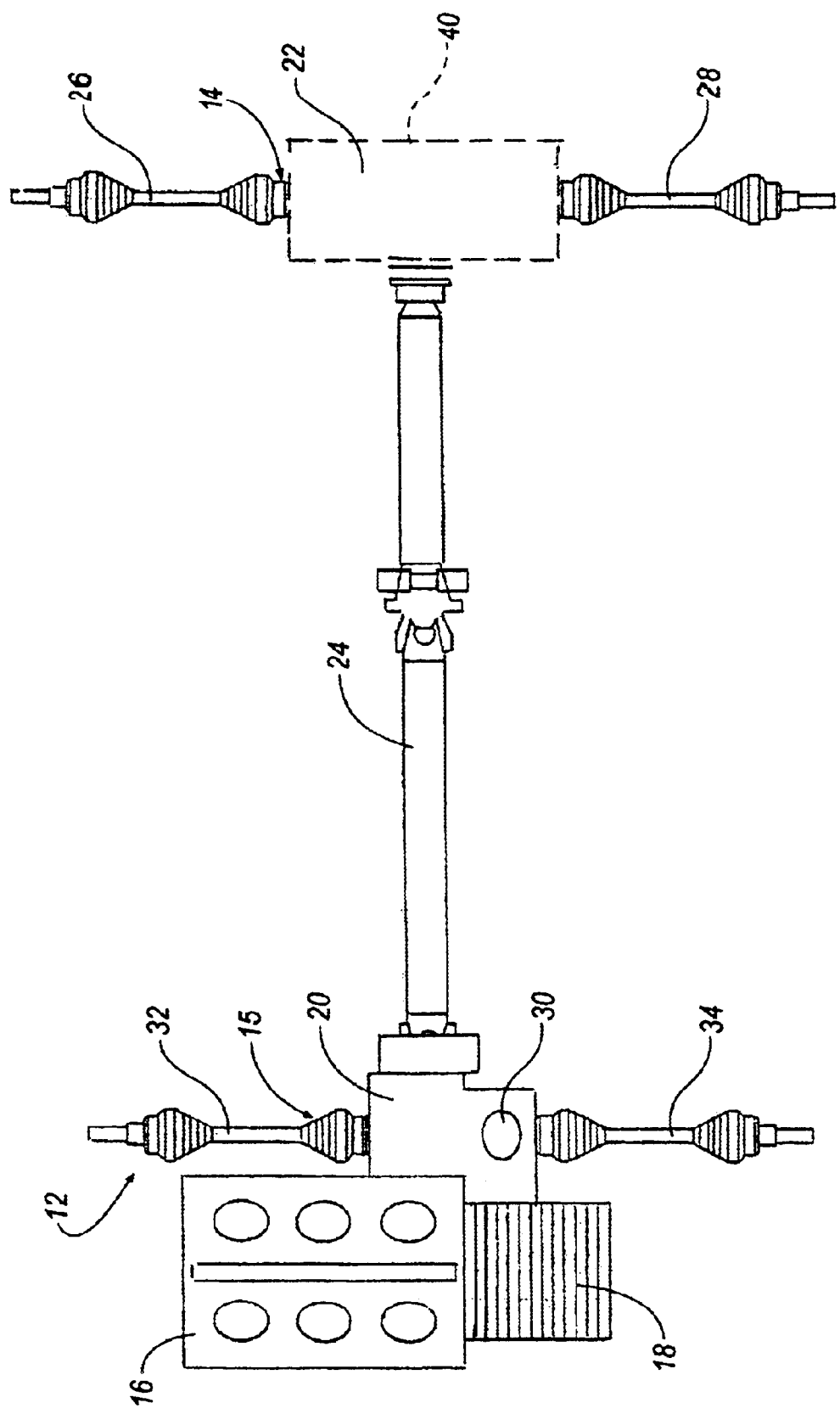
FIG. 1 shows a schematic view of a vehicle according to the present invention.

Referring to the drawings, an axle module 22 according to the present invention is shown. FIG. 1 schematically illustrates an all-wheel drive vehicle or four-wheel drive vehicle 12 that is primarily front wheel driven, however the present invention can also be used on a primary rear wheel driven vehicle.

A motor vehicle 12 as shown in FIG. 1 is permanently driven by a front axle 15. The motor vehicle 12 is driven by power transferred from the engine 16 through a transaxle or a gear box 18 which may be either an automatic or manual gear box. The power from the gear box 18 enters the power take-off 20 of the drivetrain assembly and finally on through to the front differential 30. When there is a demand for power, it is transferred to the rear axle module 22 via a propeller shaft or driving shaft 24. At the rear axle module 22 power splits to a left hand rear side shaft 26 and a right hand rear side shaft 28 for distribution to the wheels at the rear of the vehicle 12. The front differential or front axle module 30 distributes torque between the left hand front side shaft 32 and the right hand front side shaft 34. In an all-wheel drive vehicle, power is delivered to both the rear axle module 22 and the front differential 30, the front axle 15 is the primarily driven axle while the rear axle 14 only receives power when needed. One embodiment of the present invention is an all-wheel drive vehicle wherein torque is distributed to each wheel of the secondary axle depending on if the wheels of the primary driven axle are in a slip condition or a non-slip condition with respect to the road. The axle module 22 of the present invention can also be used in either the front or rear axle of an all-wheel drive unit or even in both the front and rear axles if necessary. One end of the prop shaft 24 includes a pinion gear 42 which is rotatably supported within the axle module 22 and provides the necessary power needed to spin the side shafts 26,28 and each wheel on the secondary axle.

Figure 2:
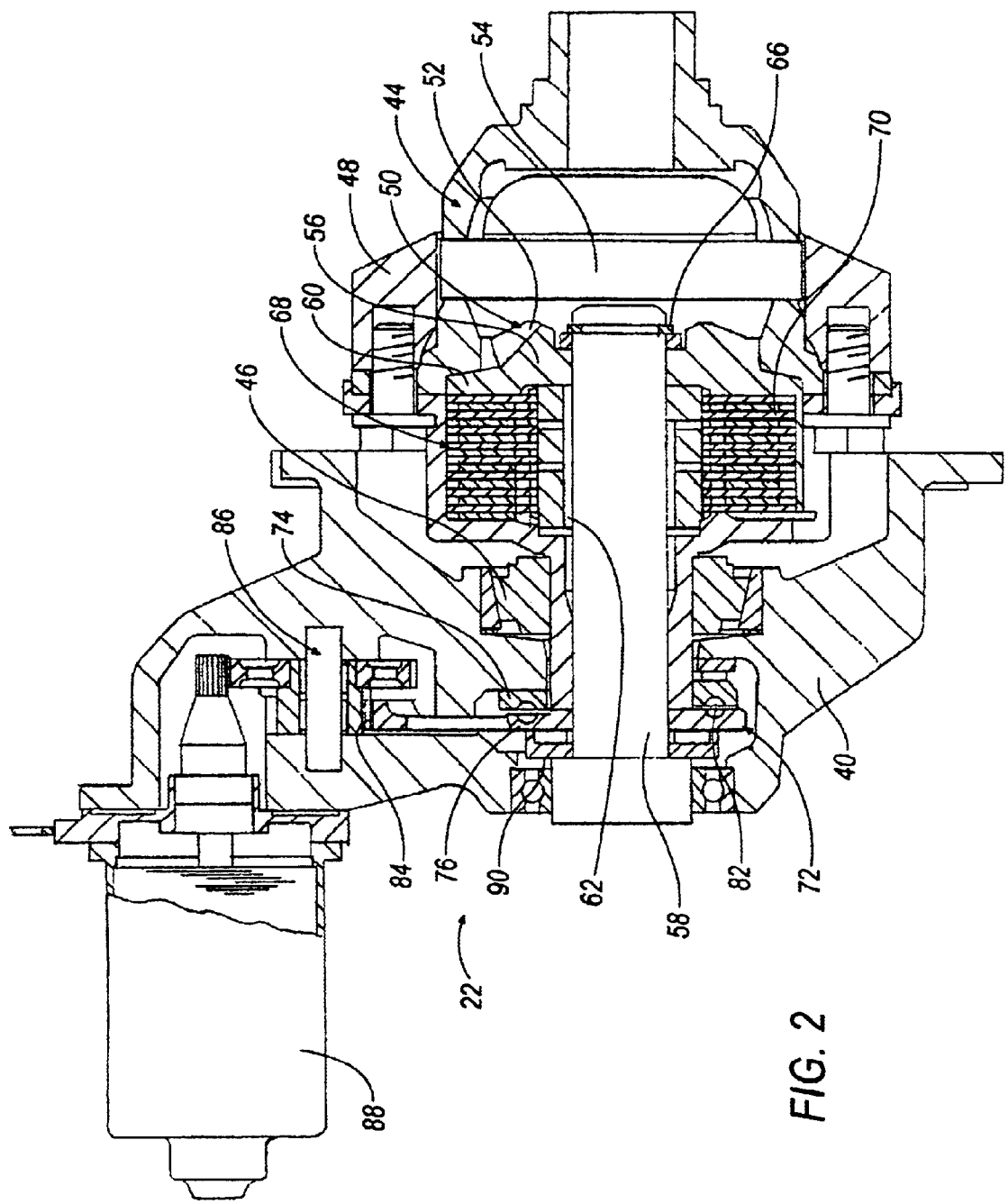
FIG. 2 shows a partial cross section of an axle module according to the present invention.

FIG. 2 shows a partial cross section of the axle module 22 according to the present invention. The axle module 22 includes a housing 40. The housing 40 includes at least one end plate on an end thereof. A differential carrier 44 is rotatably supported within the housing 40. The differential carrier 44 is rotatably supported by a first and second set of bearings 46. A ring gear 48 is connected to an outer surface of the differential carrier 44. The pinion gear 42 interacts with and engages the ring gear 48 and spins the differential carrier 44 at the prop shaft axle speed. A differential gear set 50 is rotatably supported within the differential carrier. The differential gear set 50 includes two differential gears 52 that are rotatably arranged on a bearing pin 54, whose axis forms a rotational axis for the two differential gears 52. The rotational axis for the differential gears 52 will intersect the rotational axis for the differential side gears 56 within the differential carrier 44. The differential gear set 50 also includes two differential side gears 56 that are arranged around a rotational axis that is rotatable relative to the differential carrier 44. The axis of rotation of the side gears 56 and the axis of rotation of the differential gears 52 intersect each other at a right angle. Each of the side gears 56 is rotatably fixed to a stub shaft 58,94 which extends from each end of the differential carrier 44. Each of the stub shafts 58,94 are then connected to a half shaft 26,28 of the motor vehicle and eventually to a wheel on each side of the side shafts 26,28.

In one embodiment one of the side gears 56 is integrated with a pressure plate 60 and forms an integrated side gear pressure plate 56 for the axle module 22. The integrated side gear pressure plate 56 has a plurality of teeth 62 on an inner circumference thereof which mate with and engage with a plurality of teeth 64 on an outer surface of one of the stub shafts 58,94. It should be noted that in one embodiment the pressure plate 60 is integrated with the side gear 56 into one unitary piece. However, it should be noted that the pressure plate 60 may be connected to the side gear 56 by any other known mechanical, chemical or bonding method, and may even be separate pieces that are connected to form one integrated unit. The integrated side gear pressure plate 56 is held axially in place with respect to the stub shaft 58 by a retainer ring 66 which is arranged within a circular groove at one end of the stub shaft 58. This will ensure that any axial movement of the stub shaft 58 will also create axial movement of the side gear pressure plate member 56 in the same axial direction out towards the vehicle wheel.

A clutch pack 68 is arranged within the differential carrier 44. The clutch pack 68 engages the pressure plate 60 of the integrated side gear pressure plate member 56 on one side thereof and engages the differential carrier housing 44 on the opposite side thereof. The clutch pack 68 includes a plurality of friction plates 70 arranged in an alternating pattern with the integrated side gear pressure plate 56 on an inner circumference thereof and an inner surface of the differential carrier on an outer circumference, thereof. Every other friction plate 70 is engaged with the integrated side gear pressure plate 56 or the inner surface of the differential carrier 44. The plurality of friction plates 70 connected to the inner surface of the integrated side gear pressure plate 56 are rotatably fixed with respect to the integrated side gear pressure plate 56. These friction plates 70 engaged with the integrated side gear pressure plate 56 are axially movable along the outer circumference of the side gear pressure plate member 56. The plurality of plates 70 that in an alternating interval are engaged with the inside surface of the differential carrier 44 are rotatably fixed with respect to the differential carrier 44 and therefore, spin at the axle speed. These plurality friction plates 70 engaged with the differential carrier are axially movable with respect to the differential carrier 44. The axle module 22 generally has an open differential which allows for transfer of torque across the differential gear set 50 in an equal amount to that being applied to one stub shaft 58 of the axle module 22. Hence, if 50% torque is being applied to the left hand stub shaft 58 then the right hand stub shaft 94 will also have 50% torque because of the open differential arrangement of the differential carrier 44.

The axle module 22 also includes a ball ramp expander mechanism 72 arranged between the housing 40 and the stub shaft 58. The ball ramp expander mechanism 72 includes a first ramp 74 and a second ramp 76. The first ramp 74 is rotatably fixed with respect to the housing 40. It should be noted that the first ramp 74 may also be connected to the bearings 46 that support the differential carrier 44 or any other non-rotatable unit within the axle module housing 40. The first ramp 74 includes a plurality of ramps 78 on a side surface opposite from the surface connected to the housing 40. Adjacent and facing the first ramp 74 is a second ramp 76 that also includes a plurality of ramps 80 on a side surface that is adjacent to and faces the ramps 78 of the first ramp unit 74. Located within the ramps 78,80 of both the first and second ramp 74,76 are a plurality of expander balls 82 which are capable of movement within the ramps 78,80 of the ball ramp mechanism 72. The second ramp 76 also includes a plurality of teeth 84 on an outer circumference thereof. These teeth 84 engage with a gear set 86 that engages with a drive motor 88 on an opposite side of the gearing 86. The drive motor 88 will provide the necessary rotational force to provide for rotation of the second ramp member 76 with respect to the first ramp member74.

A thrust race or transfer plate 90 engages the second ramp 76 on a side surface opposite of the expander balls 80. The opposite side of the thrust race 90 engages with the stub shaft 58. When the second ramp 76 rotates with respect to the first ramp 74, the expander balls 82 rotate along the ramp surfaces of the second 76 and first ramp 74. These ramp surfaces 78,80 have a predetermined angle which will transfer a predetermined axial movement and/or force to the second ramp 76, as the first 74 and second ramp 76 separate from each other in an axial direction. Therefore, the ball ramp mechanism 72 translates a rotational force into an axial force which is used to axially move the thrust race 90 and hence the stub shaft 58 in a direction towards the wheel of an automotive vehicle. Therefore, the stub shaft 58 is capable of axial movement within the axle module 22. The stub shaft 58 has the integrated side gear pressure plate 58 axially fixed with respect thereto. Hence, when the stub shaft 58 moves in the axial direction, due to the forces developed by the ball ramp expander mechanism 72, this will create an axial movement of the integrated side gear pressure plate 56. The pressure plate 60 engages the clutch pack 68 on one side thereof and hence will compress the clutch pack friction plates 70 into one another and against the differential carrier 44. This will allow for input torque to be transferred from the ring gear 48 which spins at axle shaft speed, through the friction plates 70 to the integrated side gear pressure plate 56 and hence to the stub shaft 58. This torque is then transferred to half shafts 26,28 of the automotive vehicle.

It should be noted that the drive motor 88 is electronically connected to a controller or other on board computer system of the automotive vehicle. Generally, the controller and on board computer system monitor a number of sensors which are constantly sampling data, such as vehicle speed, throttle location, braking condition, yaw rate and many other identifiable factors used in controlling a drivetrain of an automotive vehicle. With the activation of the clutch pack 68 by the pulling or tension of the stub shaft 58 the same amount of torque will be transferred to the opposite stub shaft 94 and the opposite wheel of the secondary axle because of the open differential in use in the differential carrier 44. The open differential is always attempting to evenly divide the torque being applied, to each half shaft 26,28.

In operation the axle module 22 with the axle shaft electronic torque management generally operates in a disengaged state. When the axle module 22 is disengaged the side shaft torque on the disconnection side ie., the side with the clutch pack 68, is effectively zero except for the slight drag force being felt by the secondary axle module. Therefore, with the open differential having its function undisturbed between the side gears 56 the reaction torque to the opposite side and opposite stub shaft 94 is reduced to zero as well. The open differential generally, has a fifty-fifty torque split between the left hand side shaft 26 and the right side shaft 28. However, when a slip condition occurs at the primarily driven axle or if the sensors sense that a slip condition might be occurring or may be starting, the controller or on board computer system will send an electronic signal to the drive motor 88 which will then activate the electronic torque management system of the rear axle or secondary axle.

After the electronic torque management is activated or engaged, the motor 88 will send a predetermined rotational torque through the expander mechanism 72 which will axially move the stub shaft 58 and hence the integrated side gear pressure plate 56, into the clutch pack 68. This axial movement will engage the clutch pack 68 by having the friction plates 70 compress into one another and will transfer a predetermined amount of torque to the left hand side stub shaft 58 through the clutch pack 68. This transfer of a predetermined amount of torque will create a reaction toque that will transfer the same torque to the other side of the differential via the open differential. This axle module 22 will always function as a typical open differential distributing torque equally to both the left hand and right hand side shaft 26,28 as well as allowing for full differentiation thereof. This type of function is maintained from zero input torque all the way through to the maximum clutch pack torque of the axle module system. The clutch pack 68 will stay engaged as long as the sensors detect that more traction is needed at the secondary axle.

Figure 3:
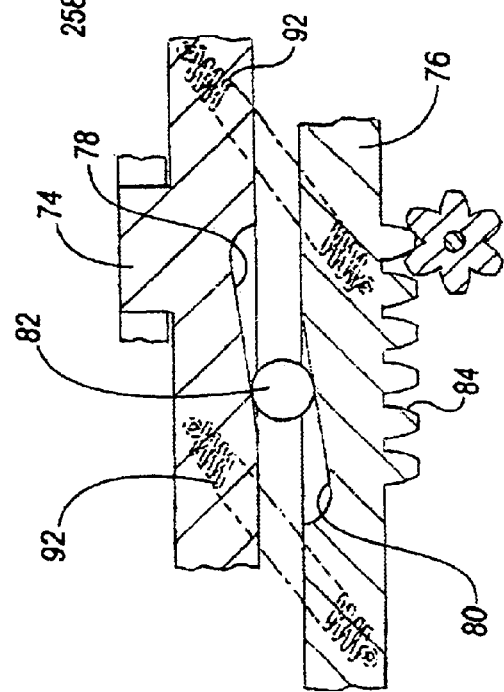
FIG. 3 shows a cross section of a ball ramp expander mechanism used in one embodiment of the present invention.

After the sensors of the automotive vehicle detect that the vehicle is removed from or is not entering a slip condition on the primary axle, the system will be disengaged. To disengage the electronic torque management the clutch plates 70 are released from being compressed between the integrated side gear pressure plates 56 and the differential carrier 44. This release of the axial force of the stub shaft 58 is either accomplished by a plurality of return springs 92 arranged between the first ramp 74 and the second ramp 76 of the ball ramp expander mechanism 72 as shown in FIG. 3. These springs 92 will allow for mechanical return of the first ramp 74 and second ramp 76 to their narrowest width thus transferring no axial load to the stub shaft 58. The springs 92 will operate after any torque delivered by the motor 88 is stopped and the springs 92 can overcome the effects of the rotary torque developed by the drive motor 88. In another embodiment it is also possible to have the motor 88 operate in reverse and rotate the second ramp 76 in the opposite direction to release the ball ramp expander mechanism 72 to its narrowest width and thus release any clutch pack 68 compression or engagement with the integrated side gear pressure plate 56 and differential carrier 44. It should be noted that with the use of the on board controller or on board computer system and the plurality of sensors in the vehicle, the axle module 22 is capable of being a disconnect which will allow for complete disconnect of the secondary axle. This creates a mechanical disconnect for the entire axle unit. It should also be noted that any range of torque may be applied to the rear axle depending on the slip condition and the needs of the all-wheel drive vehicle in its off-road environment. Therefore, the system is capable of being tuned to specific vehicle characteristics and vehicle environments with the use of the electronic torque management system in the secondary axle module 22.

Figure 4:
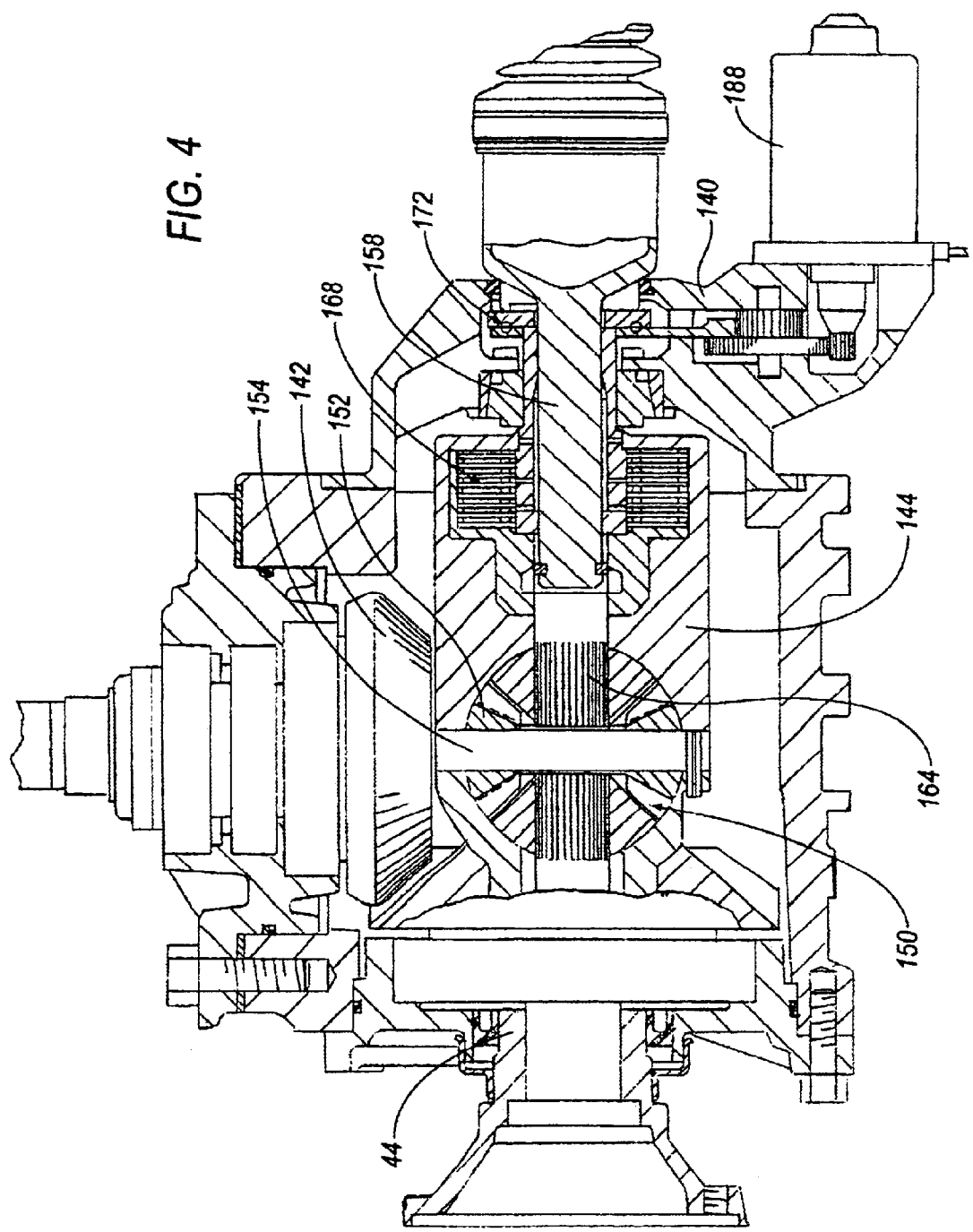
FIG. 4 shows a cross section of an alternate embodiment of an axle module according to the present invention.

FIG. 4 shows a full cross section of the axle module 22 according to an alternate embodiment of the present invention. Like numerals indicate like elements. The same discussion for FIG. 2 applies to FIG. 4. FIG. 4 further shows the opposite stub shaft 94 and its connection to the open beveled differential gear set 150. FIG. 4 also shows the pinion gear 142 engaging with the ring gear 148 of the differential carrier 144 thus, providing axle shaft speed to the differential carrier 44 and subsequently the plurality of friction plates 170 engaged with the differential carrier 144. It should be noted that generally the drive motor 188 is connected to an outer surface of the housing 140 of the axle module 22. It is electronically connected to a controller or an on board computer system.

Figure 5:
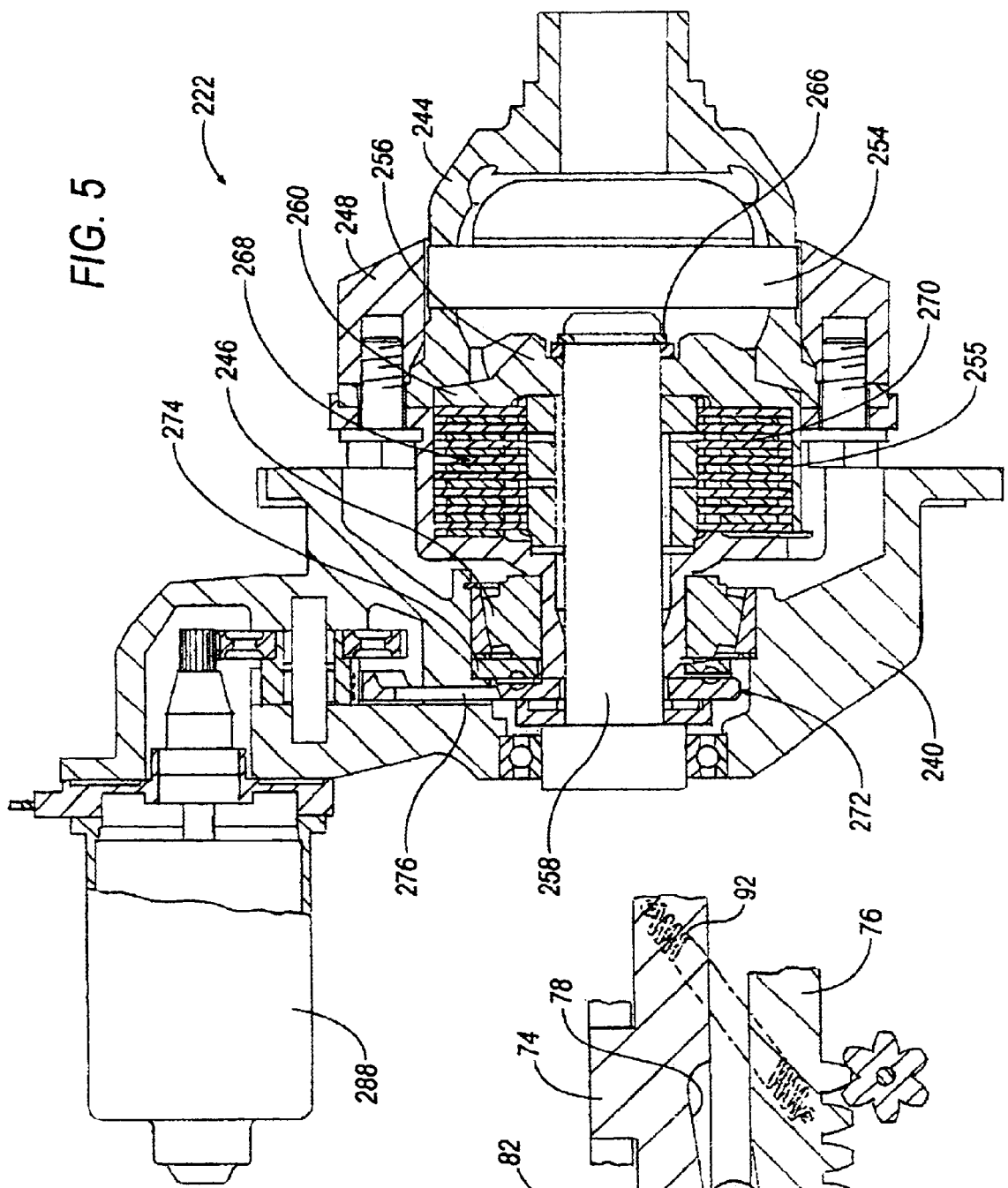
FIG. 5 shows a partial cross section of an alternate embodiment of an axle module according to the present invention.

FIG. 5 shows an alternate embodiment of the present invention. Like numerals indicate like parts. The axle module 222 is configured in the same general manner as described in FIG. 2 except that the ball ramp expander mechanism 272 is located adjacent to the stub shaft 258 on one side of the second ramp 276 and to the bearings 246 supporting the differential carrier 244 on a side surface of the first ramp 274. The differential carrier bearing 246 is thus pinned to the housing 240 of the axle module 222. The first ramp 274 of the ball ramp expander mechanism 272 is rotationally fixed with respect to the bearing 246 of the housing 240. This will allow for the proper rotation of the second ramp 276 with respect to the first ramp 274. The ball ramp expander mechanism 272 will then be capable of creating the axial force necessary to move the stub shaft 285 into tension, by pulling the stub shaft 285 out towards the wheel of the vehicle. Furthermore, it should also be noted that the integrated side gear pressure plate 256 also includes an appendage 255 axially extending from one end of the integrated side gear pressure plate 256. This axial appendage 255 does not rotatably fixed any of the plurality of friction plates 270. The plurality of friction plates 270 are either rotatably fixed with respect to the differential carrier 244 or to the integrated side gear pressure plate 256 on an inner circumference thereof.

Figure 6:
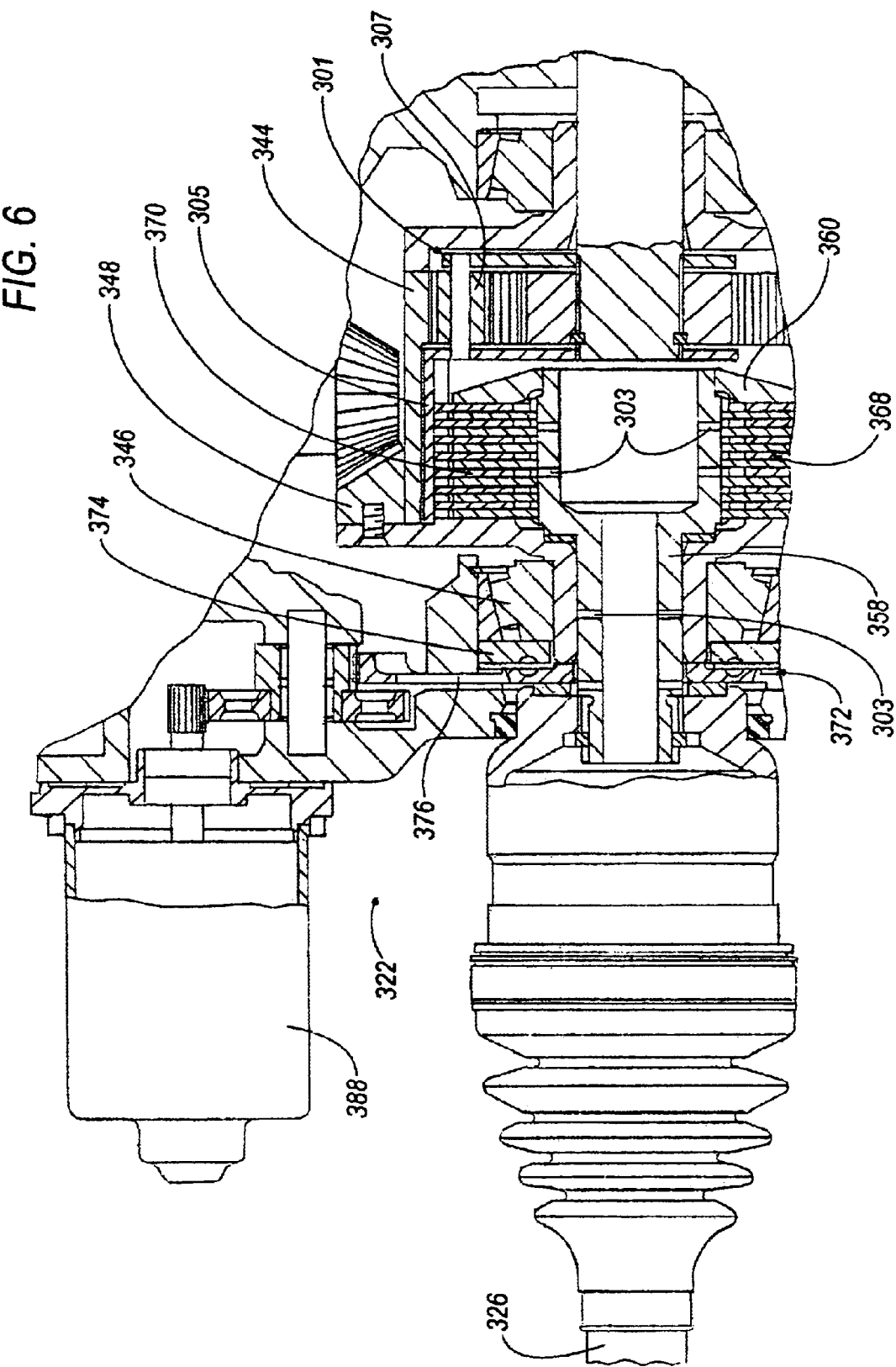
FIG. 6 shows a partial cross section of a second alternate embodiment of an axle module according to the present invention.

FIG. 6 shows yet another alternate embodiment of the axle module 22 according to the present invention and is configured in the same general manner as described in FIG. 2. Like numerals indicate like parts. The alternate embodiment in FIG. 6 uses an open planetary gear differential set 301 within the differential carrier 344. The stub shaft 358 is a hollow shaft that includes a plurality of passages 303 to allow for oil to lubricate within the hollow shaft 358. The hollow shaft 358 will also reduce the weight of the overall axle module 322. The clutch pack 368 includes a plurality of friction plates 370 alternately engaged with the output planet carrier 305 of the differential gearing or an outer surface of the shaft 358. The hollow shaft 358 includes a pressure plate 360 integrated on one end thereof. It should be noted that the pressure plate 360 may also be arranged on an outer surface of the hollow shaft 358 and pinned or secured in an axial manner with respect to hollow shaft 358. The plurality of friction plates 370 are alternately arranged such that a portion of them are engaged with the hollow shaft 358 and rotatably fixed with respect to the shaft 358 but axially movable along the outer surface of the shaft 358. The other potion of the friction plates 370 are engaged with the output planet carrier 305 and are rotatably fixed with respect to the output planet carrier 305 but axially moveable with respect thereto. The friction plates 370 are arranged such that every other plate is either connected to the planet carrier 305 or the hollow shaft 358.

As shown in FIG. 6 fifty percent of the output is carried by a planet carrier 305 while the other 50% of the output is carried by a sun gear 309 which is connected to the opposite half stub shaft 94 on the right hand side shaft 328 of the vehicle. The planet carrier 305 engages a clutch pack 368 and the hollow left hand side stub shaft 358 which connects to the left hand side shaft 326. The differential carrier 344 includes an input to the planetary gears 307 of the planetary open bevel differential. The planetary/sun differential gear arrangement will also provide a fifty-fifty torque split to both the left hand side shaft 326 and right hand side shaft 328 during non-engagement of the electronic torque management system or device. The ball ramp expander mechanism 372 is arranged between the stub shaft 358 and the bearing 346 supporting the differential carrier 344. However, it should be noted that the ball ramp expander mechanism 372 may also be arranged between the stub shaft 358 and the housing 340 of the axle module 322. The first ramp 374 is rotationally fixed with respect to the housing 340 and allows for rotation of the second ramp 376 with respect to the first ramp 374. This creates the axial load and movement necessary to put the hollow stub shaft 358 into tension thus moving the pressure plate 360 into the clutch pack 368 and compressing the plurality of friction plates 370 into one another and against the differential carrier 344 inner surface. This will allow for transfer of the input torque at the ring gear 348 from the pinion shaft 342 to the input planetary gear 370 and then to the planetary carrier 305. The torque then is transferred through the friction plates 370 to the hollow shaft 358. With the planetary differential gear set 301 acting as an open differential, the torque being applied to the hollow shaft 358 through the clutch pack 370 will also be applied through the open differential to the opposite stub shaft 394 and opposite half shaft 328 of the secondary axle. The disengagement of the axle module 322 in the secondary axle and its electronic torque management unit is accomplished in the same way as described above. Generally, the axle module 322 including the planet differential gear set 301 is used when the front axle is chosen to be the secondary axle and the rear axle the primary driven axle. Due to packaging requirements of the front drivetrain system the planetary gear set 301 is often the gear set of choice for the front axle design because of the more narrow width of the axle module 322 when the planetary gear set 301 is used versus a traditional open bevel gear set.

It should be noted that this device is capable of being installed and used on a vehicle which is a primarily front wheel drive vehicle that has a power take-off that sends torque to a rear axle pinion shaft via a prop shaft 24. This device may also be used on the front axle of a primarily rear wheel drive vehicle transferring torque to the front when necessary. Generally, the "hang-on" layout used for the above-identified invention is used on a primarily front wheel drive configuration where the front wheels are providing the drive torque approximately 90% of the vehicle drive time. Generally, front wheel drive vehicles have a transverse engine front wheel drive configuration which incorporates a transaxle and a power take-off unit wherein the power take-off unit transfers power from the front differential case and final drive unit but also incorporates a 90° gear box which directs the torque to the rear of the vehicle via a prop shaft 24. This is considered to be a direct drive because there is no disconnect between the front differential and the drive shaft 24 thus, the drive shaft 24 connects to the rear axle pinion via a solid connection and drives the rear axle module 22 at axle shaft speed.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention maybe practiced otherwise then as specifically described.

What is claimed is:

1. An axle module for use in a vehicle having a plurality of wheels, said module including:
   a housing;
   a differential carrier rotatably supported in said housing;
   a ring gear connected to said differential carrier;
   a differential gear set rotatably supported within said differential carrier;
   a stub shaft having a side gear pressure plate of said differential gear set integrated thereon;
   a clutch pack arranged within said differential carrier, said clutch pack engaging said differential carrier and said side gear pressure plate;
   a ramp unit contacting said stub shaft or a thrust ring on one side and contacting said housing or a bearing or an opposite side thereof; and
   a drive motor controlling said ramp unit.

2. The module of claim 1 wherein said clutch pack having a plurality of friction plates, said friction plates connected to said differential carrier and said stub shaft in an alternating sequence.

3. The module of claim 2 wherein said ramp unit having a ball ramp expander mechanism, said ball ramp expander creates an axial force that acts on said stub shaft.

4. The module of claim 3 wherein said stub shaft is axially secured to said side gear pressure plate and transfers said axial force to said side gear pressure plate, said side gear pressure plate compresses said friction plates and transfers an input torque from said ring gear to said stub shaft.

5. The module of claim 4 wherein differential gear set having an open differential configuration.

* * * * *